(12) United States Patent
Frey et al.

(10) Patent No.: US 11,820,545 B2
(45) Date of Patent: Nov. 21, 2023

(54) APPARATUS AND METHOD FOR REMOVING TWINE FROM A BALE

(71) Applicant: 1708828 Ontario Limited, Listowel (CA)

(72) Inventors: Ryan Earl Frey, Listowel (CA); Oscar Frey, Listowel (CA)

(73) Assignee: 1708828 Ontario Ltd., Ontario (CA)

( * ) Notice: Subject to any disclaimer, the term of this patent is extended or adjusted under 35 U.S.C. 154(b) by 394 days.

(21) Appl. No.: 17/077,562

(22) Filed: Oct. 22, 2020

(65) Prior Publication Data

US 2021/0120746 A1  Apr. 29, 2021

Related U.S. Application Data

(60) Provisional application No. 62/926,118, filed on Oct. 25, 2019.

(51) Int. Cl.
| | | |
|---|---|---|
| *A01F 29/00* | (2006.01) | |
| *B65B 69/00* | (2006.01) | |
| *B26D 3/18* | (2006.01) | |
| *A01D 87/00* | (2006.01) | |

(52) U.S. Cl.
CPC ........ *B65B 69/0025* (2013.01); *A01D 87/003* (2013.01); *B26D 3/185* (2013.01); *Y10T 83/6587* (2015.04)

(58) Field of Classification Search
CPC .. B65B 69/0025; A01D 87/003; B26D 3/185; Y10T 83/6587
USPC .......................................................... 83/564
See application file for complete search history.

(56) References Cited

U.S. PATENT DOCUMENTS

| 3,241,695 | A | * | 3/1966 | Bishop | A01D 87/126 |
| | | | | | 294/107 |
| 5,318,399 | A | * | 6/1994 | Marom | B65B 69/0025 |
| | | | | | 414/412 |
| 5,374,156 | A | * | 12/1994 | Simpson | B66F 9/08 |
| | | | | | 414/667 |
| 11,291,163 | B2 | * | 4/2022 | Frey | A01D 87/127 |
| 2003/0177740 | A1 | * | 9/2003 | Rutten | B65B 69/0033 |
| | | | | | 53/381.1 |
| 2017/0064908 | A1 | * | 3/2017 | Sell | B26D 3/08 |
| 2018/0016049 | A1 | | 1/2018 | Schmitz et al. | |
| 2021/0051857 | A1 | * | 2/2021 | Smith | A01D 87/127 |
| 2022/0346325 | A1 | * | 11/2022 | Gautron | A01D 87/127 |

FOREIGN PATENT DOCUMENTS

WO  2006118469 A1  11/2006

\* cited by examiner

*Primary Examiner* — Omar Flores Sanchez
(74) *Attorney, Agent, or Firm* — Bereskin & Parr LLP (57) ABSTRACT

An apparatus for removing twine from a bale is described herein. The apparatus includes a frame having a mounting portion configured to releasably mount to a vehicle and two opposed arms rigidly coupled to and extending in a common direction from the mounting portion. The apparatus also includes a bale grabbing mechanism coupled to the frame and configured to releasably secure the bale against the opposed arms of the frame, a cutting mechanism movably coupled to one of the opposed arms of the frame, the cutting mechanism including a cutting element being configured to cut the twine and a twine grabbing mechanism coupled to the other opposed arm of the frame. The twine grabbing mechanism is configured to retain the twine after the twine has been cut by the cutting mechanism.

20 Claims, 9 Drawing Sheets

APPARATUS AND METHOD FOR REMOVING TWINE FROM A BALE

CROSS REFERENCE

This application claims the benefit of U.S. Provisional Patent Application No. 62/926,118 entitled "Apparatus and Methods for Removing Twine from a Bale" filed Oct. 25, 2019. The entire content of this application is hereby incorporated by reference herein in its entirety for all purposes.

TECHNICAL FIELD

The embodiments disclosed herein relate to apparatus and methods for processing bales, and more specifically to apparatus and methods for removing twine from bales.

BACKGROUND

When individual bales of field crops (e.g. hay, straw, silage or another field crop that gets baled) are baled, a material such as twine or another wrapping material is wrapped around the bale to hold its shape. Wrapping bales with twine provides for producers to easily transport bales and to reduce the amount of field crop lost to spoilage.

Natural twine is typically made of sisal fibres and synthetic twine is typically made of polypropylene or another similar plastic material. Unfortunately, both natural and synthetic twine can clutter processing machinery and, if consumed, harm livestock if not properly removed. Consumption of natural or synthetic twine by livestock can block the intestinal tract and/or decrease the stomach capacity of livestock because it does not decompose or break down.

Removing twine from bales of field crops can be a strenuous and potentially dangerous activity for livestock producers. To remove twine from a bale, an operator must dismount from a machine used for transporting the bale, cut the twine, remove the twine from the bale, collect the twine, and then remount the machine to finish feeding the bale into further processing machinery. Ideally, the twine can be removed from the bale and collected without the operator having to dismount the machine.

Accordingly, there is a need for an apparatus that removes and collects twine from bales and does not require an operator to dismount from their machine.

SUMMARY

An apparatus for removing twine from a bale is described herein. The apparatus includes a frame having a mounting portion configured to releasably mount to a vehicle and two opposed arms rigidly coupled to and extending in a common direction from the mounting portion. The apparatus also includes a bale grabbing mechanism coupled to the frame and configured to releasably secure the bale against the opposed arms of the frame; a cutting mechanism movably coupled to one of the opposed arms of the frame, the cutting mechanism including a cutting element being configured to cut the twine; and a twine grabbing mechanism coupled to the other opposed arm of the frame, the twine grabbing mechanism being configured to retain the twine after the twine has been cut by the cutting mechanism.

In some embodiments, the bale grabbing mechanism a pair of bale grabbing mechanisms, each bale grabbing mechanism including plurality of bale grabbing members movably mounted one of the two opposed arms of the frame, the bale grabbing members being dispersed along a length of each of the opposed arms of the frame.

In some embodiments, the bale grabbing members are configured to move between a retracted position where the bale grabbing members are positioned above the bale and an extended position where the bale grabbing members are inserted into a surface of the bale.

In some embodiments, the cutting element is configured to rotate about an axis defined by the length one of the opposed arms to move between a raised position and a lowered position to cut the twine.

In some embodiments, the cutting element extends along the length of one of the opposed arms.

In some embodiments, the cutting element is a knife.

In some embodiments, the cutting mechanism includes a cutting hydraulic cylinder for rotating the cutting element to cut the twine.

In some embodiments, the twine grabbing mechanism includes a fixed twine grabbing member fixedly coupled to one of the opposed arms and a sliding twine grabbing member slidingly coupled to the one of the opposed arms, the sliding twine grabbing member configured to slide over the fixed portion to grab the twine.

In some embodiments, the twine grabbing mechanism and the cutting mechanism are positioned on different arms of the frame.

In some embodiments, the twine grabbing mechanism includes a twine grabbing hydraulic cylinder for moving the sliding twine grabbing member relative to the fixed twine grabbing member to retain the twine.

A method of removing twine from a bale is also described herein. The method includes positioning a frame of an apparatus for removing twine from the bale against a top surface of the bale; releasably securing the bale to the frame by a bale grabbing mechanism of the apparatus; gripping the twine by a twine grabbing mechanism movably coupled to the frame and positioned against the top surface of the bale; cutting the twine by a cutting mechanism movably coupled to the frame and positioned against the top surface of the bale; releasing the bale from the frame; and retaining the twine by the twine grabbing mechanism as the bale falls downwardly relative to the frame.

In some embodiments, cutting the twine includes cutting the twine along a width of the bale.

In some embodiments, cutting the twine includes pivoting a cutting element of the cutting mechanism relative to the frame between a raised position where the cutting element is spaced from the bale and a lowered position where the cutting element engages the twine and cuts the twine wrapped around the bale.

In some embodiments, cutting the twine includes pivoting the cutting element relative to the frame by actuating a cutting hydraulic cylinder coupled to the frame.

In some embodiments, gripping the twine by the twine grabbing mechanism includes sliding a sliding portion of the twine grabbing mechanism relative to a fixed portion of the twine grabbing mechanism.

In some embodiments, gripping the twine by the twine grabbing mechanism includes retaining the twine between a plurality of teeth of the sliding portion of the twine grabbing mechanism and a plurality of teeth of the fixed portion of the twine grabbing mechanism.

In some embodiments, releasably securing the bale to the frame includes rotating a plurality of members of the bale grabbing mechanism from a retracted position where the members are spaced from the bale to a extended position where the members enter a bale space defined by the bale to releasably secure the bale to the frame.

In some embodiments, at the extended position, the members enter the bale space defined by the bale through the top surface of the bale.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

The skilled person in the art will understand that the drawings, further described below, are for illustration purposes only. The drawings are not intended to limit the scope of the applicant's teachings in any way. Also, it will be appreciated that for simplicity and clarity of illustration, elements shown in the figures have not necessarily been drawn to scale. For example, the dimensions of some of the elements may be exaggerated relative to other elements for clarity. Further aspects and features of the example embodiments described herein will appear from the following description taken together with the accompanying drawings.

DETAILED DESCRIPTION

Various apparatus and methods will be described below to provide an example of each claimed embodiment. No embodiment described below limits any claimed embodiment and any claimed embodiment may cover apparatus or methods that differ from those described below. The claimed embodiments are not limited to apparatus or methods having all of the features of any one apparatus or method described below or to features common to multiple or all of the apparatus or methods described below.

Generally, apparatus and methods of removing twine from bales are described herein. It should be understood that although the bales may be referred to as hay bales herein, the apparatus and methods described herein may by used to remove twine from bales of other materials as well, such as but not limited to straw, silage or any other field crop that gets baled into bales.

Generally, the bales considered herein and illustrated in the figures are square bales, however, it will be appreciated that the apparatus and methods described herein may be adapted for use with bales of various sizes, shapes and configurations. For instance, without limiting the foregoing, the apparatus and methods of removing twine from bales described herein may be adapted for use with square bales with widths of 4 feet, 5 feet, 6 feet or more, heights of 3 feet, 4 feet, or more, and lengths of 4 feet or 5 feet or 6 feet or more.

Additionally, while the material discussed herein to be removed from the bales is generally referred to as twine, it should be noted that twine generally refers to either natural or synthetic twine. Further, the apparatus and methods described herein may also be adapted for removing various other types of material from bales including but not limited to net wrap and plastic wrap.

Figure 1:
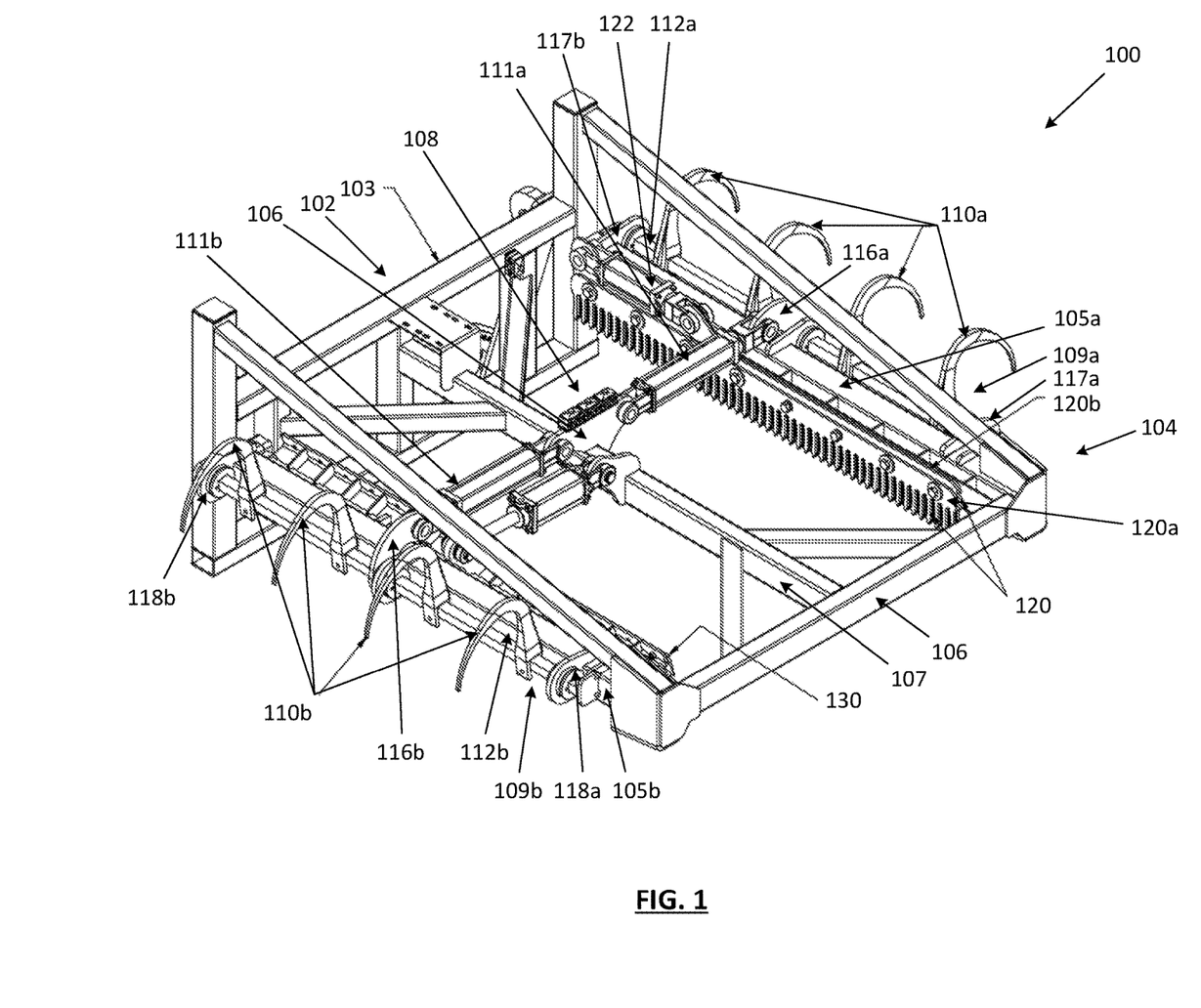
FIG. 1 shows a perspective view of an apparatus for removing twine from a bale, according to one embodiment.

Referring now to FIG. 1 illustrated therein is an apparatus 100 that includes a frame 102 having a mounting portion 103 and an extending portion 104 fixedly coupled to and extending away from the mounting portion 103. Apparatus 100 also includes a bale grabbing mechanism 108 for retaining the bale against the frame 104, a twine grabbing mechanism 120 for holding the twine wrapped around the bale as it is cut and retaining the twine after the bale has been released from the frame 102, and a cutting mechanism 130 for cutting the twine wrapped around the bale. In the embodiment shown in the drawings, the bale grabbing mechanism 108, the twine grabbing mechanism 120 and the cutting mechanism 130 are each movably coupled to the extending portion 104 of the frame 102.

Frame 102 is configured to releasably mount to a vehicle such as but not limited to a tractor, a skid steer, a front-end loader or another suitable piece of equipment for lifting and/or transporting bales via mounting portion 103. In some embodiments, apparatus 100 may be releasably mounted to a vehicle by a quick attach coupler (not shown), for example, or another suitable form of attachment that may depend on the type and/or brand of the vehicle. Mounting portion 103 typically includes one or more beams, plates, rods or the like for support and for coupling the apparatus 100 to a vehicle.

In the embodiment shown in the drawings, the extending portion 104 fixedly coupled to the mounting portion 103 includes two opposed arms 105a and 105b extending away from the mounting portion 103 in a common direction. Opposed arms 105a and 105b are fixedly coupled to each other via mounting portion 103 and a support member 106 spaced apart from the mounting portion 103. A beam 107 extends parallel to and between the two opposed arms 105a and 105b between the mounting portion 103 and the support member 106. Beam 107 can provide support to components of the apparatus 100, such as but not limited to the bale grabbing mechanism 108, the twine grabbing mechanism 120 and the cutting mechanism 130 (each described in greater detail below).

Figure 2:
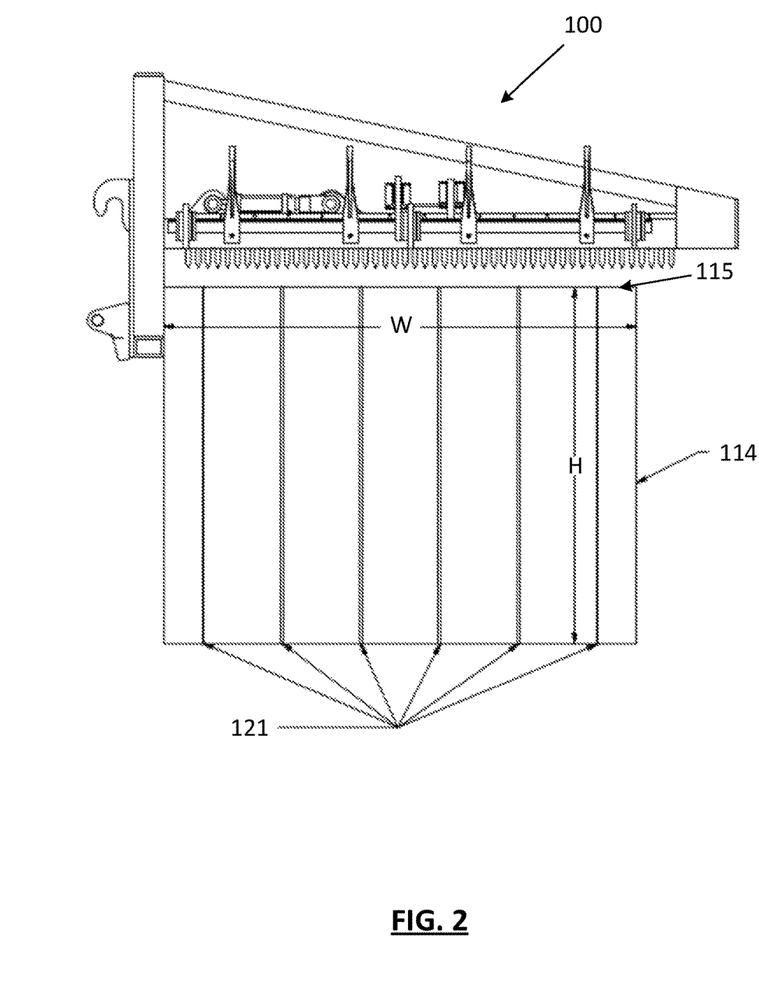
FIG. 2 shows a side view of the apparatus of FIG. 1 positioned above a bale.
Figure 3A:
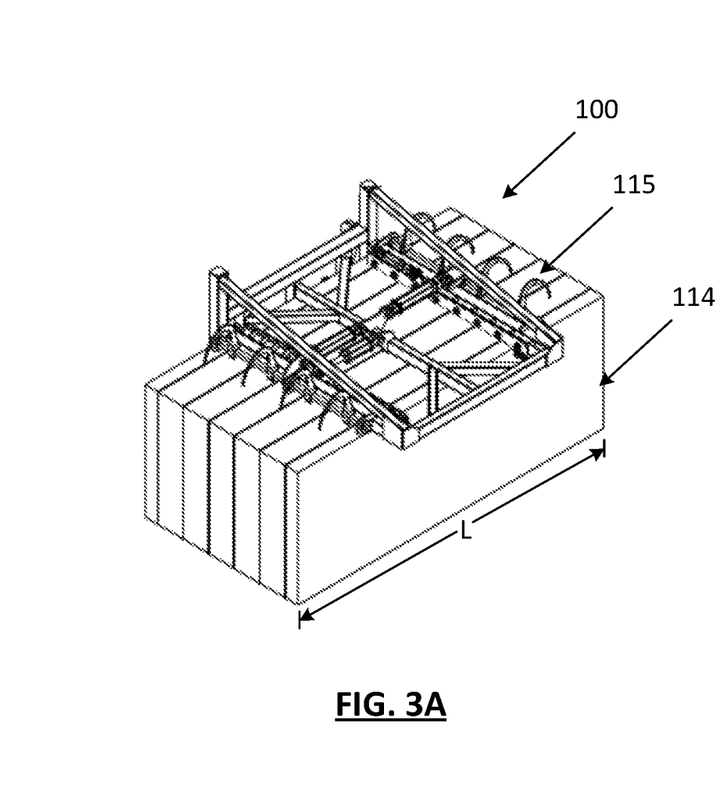
FIG. 3A shows a perspective view of the apparatus of FIG. 1 set on top of a bale.
Figure 3B:
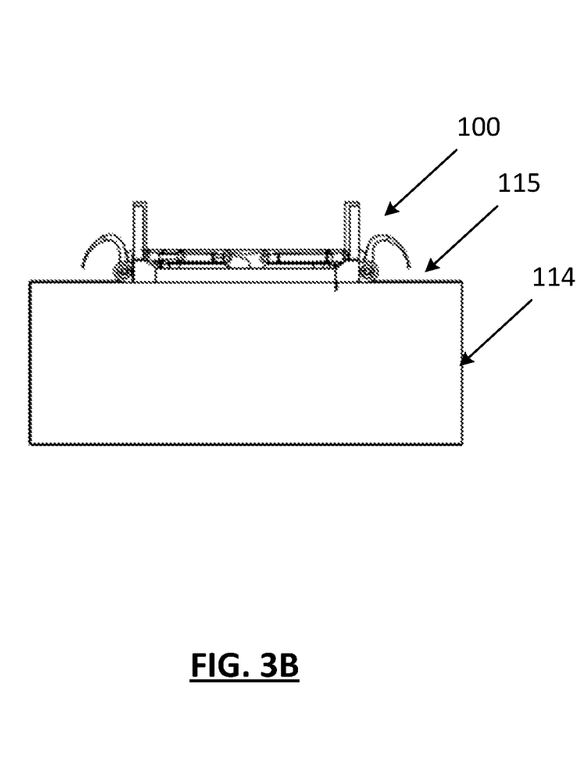
FIG. 3B shows a front view of the apparatus of FIG. 1 set on top of a bale.

Bale grabbing mechanism 108 is configured to releasably retain a bale 114 against the apparatus 100 (see FIG. 2). Specifically, bale grabbing mechanism 108 is configured to releasably retain a top surface 115 of a bale 114 against frame 102 of apparatus 100 after the frame 102 has been placed against the top surface 115 of the bale 114 (see FIGS. 2 and 3). Bale 114 generally has a height H, a width W and a length L (see FIG. 3).

Bale grabbing mechanism 108 includes a right grabbing assembly 109a and a left grabbing assembly 109b that are connected by a flange 113 coupled to the beam 107. Each of the assemblies 109a and 109b includes an actuator 111, a flange 116, a rod 112 and a set of grabbing members 110. Herein, the reference numbers 111a, 116a, 112a and 110a are used to indicate the actuator, flange, rod and set of grabbing members of the right grabbling assembly 109a, respectively, and the reference numbers 111b, 116b, 112b and 110b are used to indicate the actuator, flange, rod and set of grabbing members of the left grabbling assembly 109b, respectively.

Figure 4A:
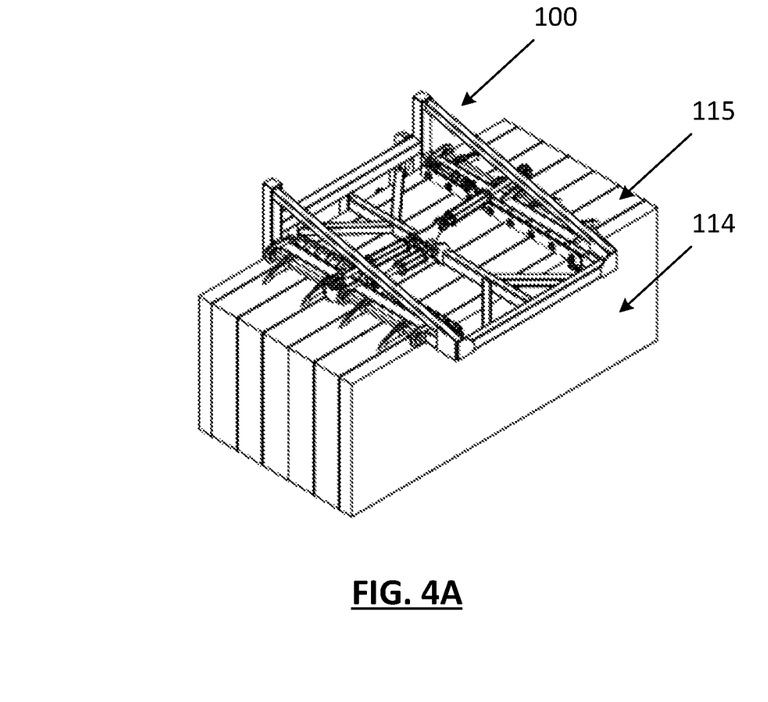
FIG. 4A shows a perspective view of the apparatus of FIG. 1 set on top of a bale with grabbing mechanisms of the apparatus in a extended position.
Figure 4B:
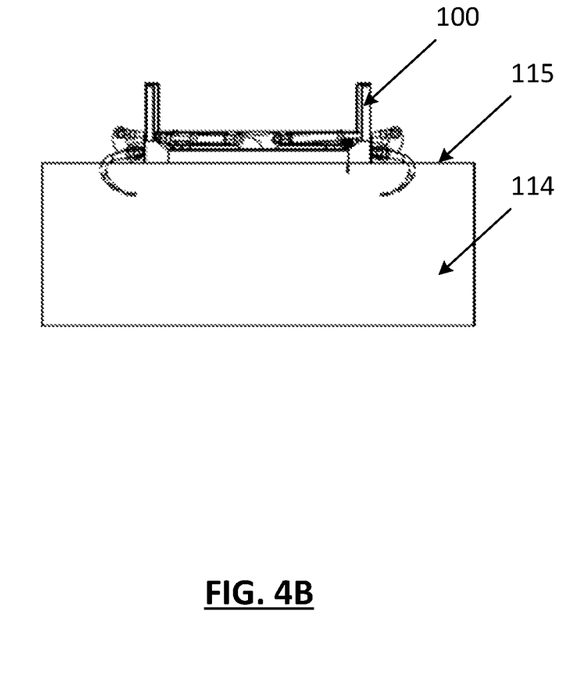
FIG. 4B shows a front view of the apparatus of FIG. 1 set on top of a bale with grabbing mechanisms of the apparatus in their extended position.

Each grabbing assembly 109a and 109b is configured to move between a retracted position (see FIGS. 3A and 3B) where members 110 are spaced apart from the bale 114 and an extended position (see FIGS. 4A and 4B) where members 110 engage the bale 114 to retain the bale 114 against the apparatus 100. In the extended position, the members 110 penetrate the bale 114 to retain the bale 114 against the apparatus 100.

In the embodiment shown in the drawings, right bale grabbing members 110a are each coupled to a rod 112a that is configured to rotate about an axis of rotation of the rod 110a. Rod 110a is rotatably coupled to first arm 105a via connecting portions 117a and 117b positioned at opposed ends of the rod 110a. Flange 116a is coupled to the rod 112a at a mid portion thereof and coupled to actuator 111a such that extension of the actuator 111a rotates the rod 112a and the grabbing members 110a downwardly and into the bale 114. Conversely, retraction of the actuator 111a rotates the rod 112a and the grabbing members 110a upwardly to remove the grabbing members 110a from the bale 114.

Similarly to the right grabbing assembly 109a described above, left bale grabbing members 110b are each coupled to a rod 112b that is configured to rotate about an axis of rotation of the rod 110b. Rod 110b is rotatably coupled to second arm 105b via connecting portions 118a and 118b positioned at opposed ends of the rod 110b. Flange 116b is coupled to the rod 112b at a mid portion thereof and coupled to actuator 111b such that extension of the actuator 111b rotates the rod 112b and the grabbing members 110b downwardly and into the bale 114. Conversely, retraction of the actuator 111b rotates the rod 112b and the grabbing members 110b upwardly to remove the grabbing members 110b from the bale 114.

In the embodiment shown, each of the actuators 111a and 111b is coupled to the middle beam 107 by a y-shaped flange 106. Also in the embodiment shown, each set of bale grabbing members 110a and 110b is shown as a hook, however, it should be understood that the grabbing members 110 may be configured as other shapes or have other sizes to retain the bale against the frame 102 (e.g. extending portion 104).

As shown in FIG. 1, twine grabbing mechanism 120 (see FIGS. 5A and 5B) includes a fixed twine grabbing member 120a, a sliding twine grabbing member 120b and a twine grabbing actuator 122.

Fixed twine grabbing member 120a is fixedly mounted to the frame 102, such as but not limited to the extending portion 104. In the embodiment shown in the drawings, the fixed twine grabbing member 120a is fixedly coupled (e.g. bolted) to arm 105a. Sliding twine grabbing member 120b is slidably mounted to an inner surface of the arm 105a and configured to move between an engaged position and a disengaged position.

Fixed twine grabbing member 120a includes grabbing elements (e.g. teeth) 124 and sliding twine grabbing member 120b includes grabbing elements (e.g. teeth) 126 to engage and retain twine 121 wrapped around the bale 114.

Figures 5A, 5B:
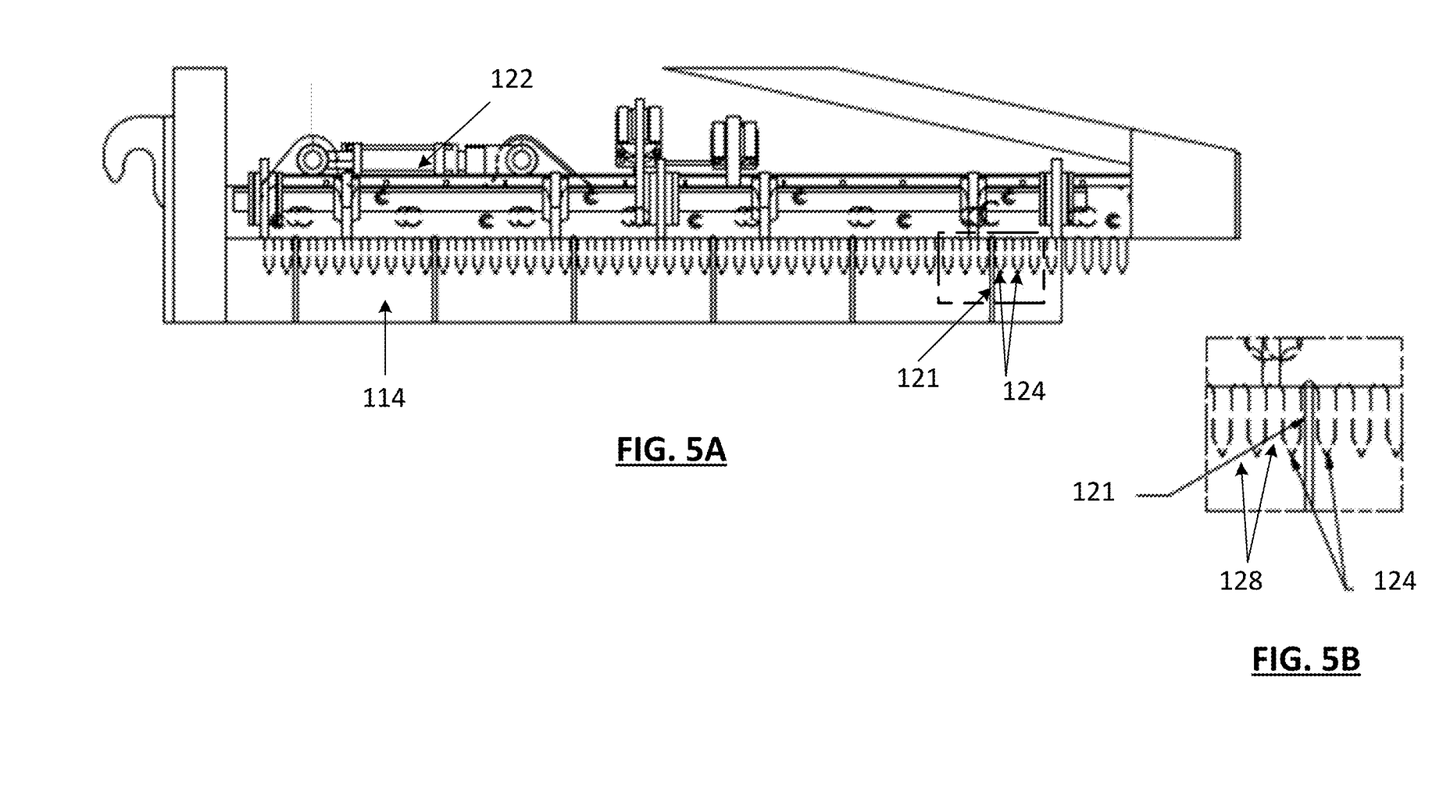
FIG. 5A shows a side view of the apparatus of FIG. 1 set on top of a bale with a twine grabbing mechanism of the apparatus in a disengaged position.
FIG. 5B shows an enlarged view of the portion of the cutting mechanism of the apparatus of FIG. 1 as indicated in FIG. 5A, showing the twine grabbing mechanism in the disengaged position.

Teeth 124 and 126 extend downwardly from the frame 102 towards the bale 114 and are generally blunt to pinch twine that enters spacing 128 (see FIGS. 5A and 5B) between adjacent teeth when the twine grabbing mechanism is in a disengaged position. Specifically, when the apparatus 100 is placed on top surface 115 of bale 114, the teeth 124 of the fixed twine grabbing member 120a and the teeth 126 of the sliding twine grabbing member 120b penetrate the top surface 115 of the bale 114. In the disengaged position of the twine grabbing mechanism 120 (see FIGS. 5A and 5B), each of the teeth 124 of the fixed twine grabbing member 120a are registered with (i.e. aligned one in front of the other) the teeth 126 of the sliding twine grabbing member 120b and with spaces between the teeth. As shown in FIG. 5B, the disengaged position of the twine grabbing mechanism 120 provides for at least a portion of the twine 121 extending around the bale 114 to fit within one or more of the spacing 128 between the teeth when the teeth 124 and the teeth 126 are aligned with each other (teeth 126 are positioned behind teeth 124 in FIG. 5B).

Figure 6:
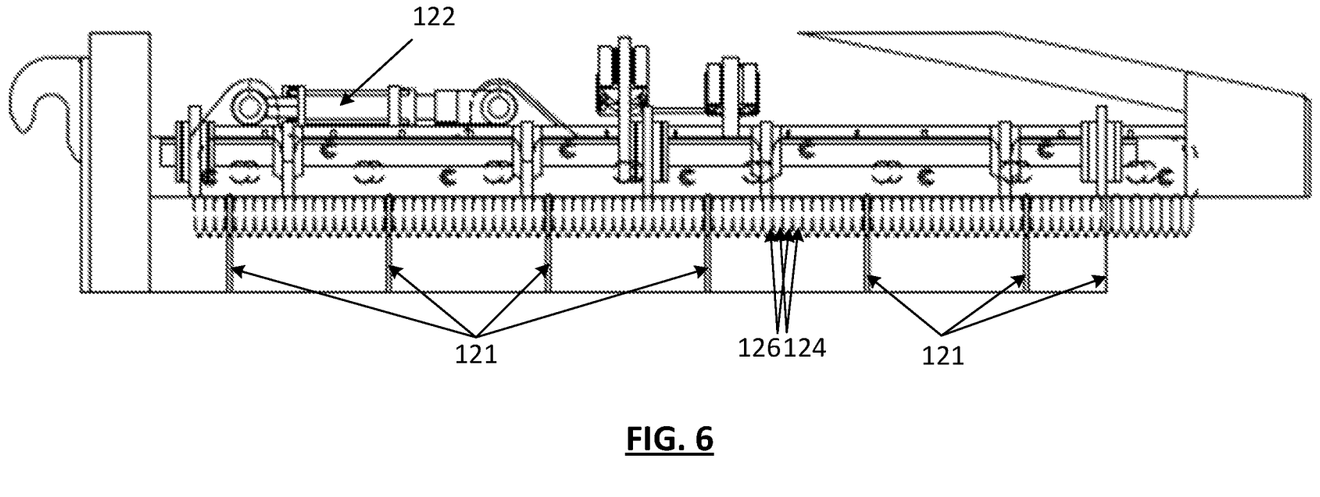
FIG. 6 shows a side view of the apparatus of FIG. 1 set on top of a bale with the twine grabbing mechanism of the apparatus in an engaged position.
Figure 7A:
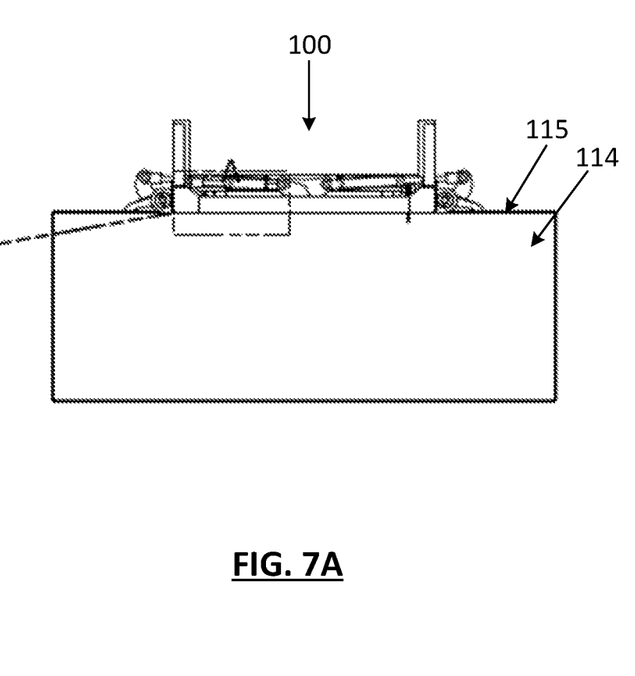
FIG. 7A shows a front view of the apparatus of FIG. 1 set on top of a bale with a cutting mechanism of the apparatus in a raised position.
Figure 7B:
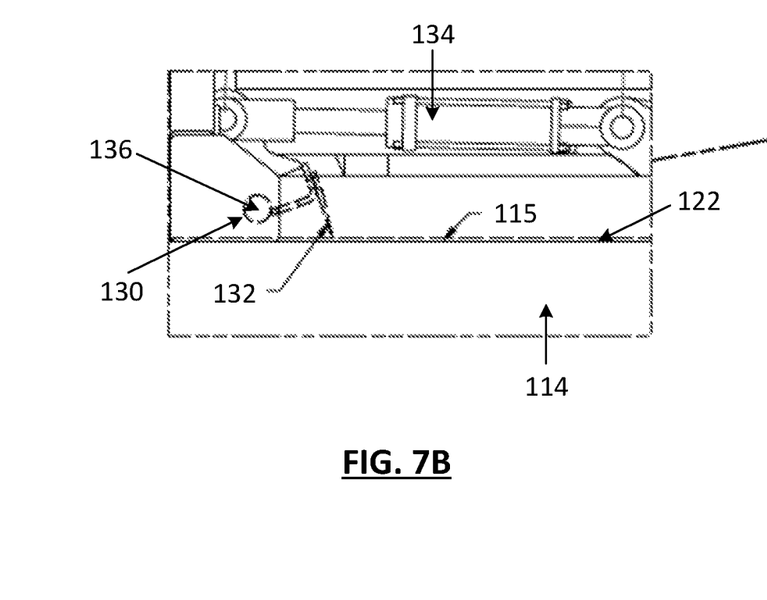
FIG. 7B shows a magnified front view of the apparatus of FIG. 1 set on top of a bale with the cutting mechanism of the apparatus in the raised position.
Figure 7C:
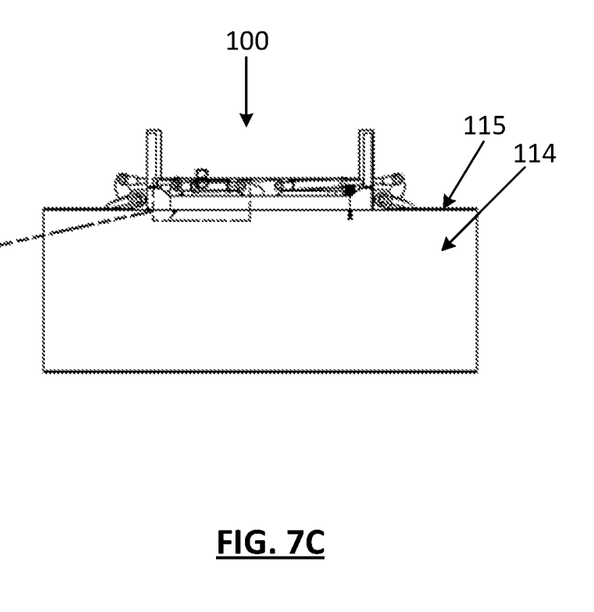
FIG. 7C shows a front view of the apparatus of FIG. 1 set on top of a bale with the cutting mechanism of the apparatus in a lowered position.
Figure 7D:
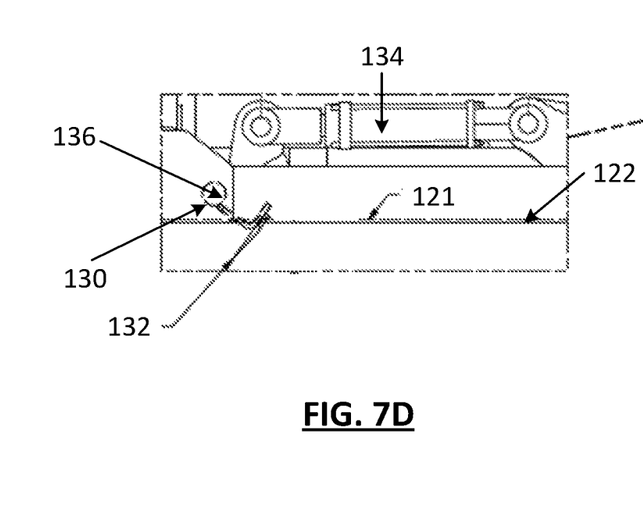
FIG. 7D shows a magnified front view of the apparatus of FIG. 1 set on top of a bale with the cutting mechanism of the apparatus in the lowered position.

Upon actuation of twine grabbing actuator 122 (see FIG. 6), the twine grabbing mechanism 120 moves from its disengaged position to its engaged position. In the engaged position, the teeth 126 of the sliding twine grabbing member 120b slide horizontally relative to the teeth 124 of the fixed twine grabbing member 120a. This motion reduces a width of each spacing 128 and the twine 121 is pinched in between adjacent teeth 126 of the sliding twine grabbing member 120b and teeth 124 of the fixed twin grabbing member 120a. In some embodiments, the sliding twine grabbing member 120b slides a distance of about ½ inch in a direction away from the mounting portion 103 of the frame 102 to retain the twine 121 upon extension of the actuator 122. Conversely, sliding twine grabbing member 120b slides a distance of about ½ inch in a direction towards the mounting portion 103 of the frame 102 upon retraction of the actuator 122.

In the embodiments shown in the drawings, twine grabbing actuator 122 is shown as being aligned with at least one of the opposed arms 105a, 105b and extension of the twine grabbing actuator 122 provides for the sliding twine grabbing member 120b to slide relative to the fixed twine grabbing member 120a.

Twine cutting mechanism 130 includes a cutting element such as a blade 132 for cutting the twine 121 wrapped around the bale 114 and an actuator 134 for moving the cutting element between a raised position where the cutting element is spaced from the bale 114 and a lowered position where the cutting element 132 engages the twine 121 and cuts the twine 121.

Cutting element 132 generally extends along the width W of the bale 114 to cut twine that is wrapped around the bale 114 at different positions along the width W of the bale 114. As shown in FIGS. 7A-7D, actuation of the actuator 134 (e.g. retracting) rotates a rod 136 coupled to the cutting element 132 to rotate the cutting element 132 from the raised position where the cutting element is spaced from the bale 114 (see FIG. 7B) towards a lowered position where the cutting element 132 engages the twine 121 and cuts the twine 121 (see FIG. 7D). In some embodiments, the vertical travel of an edge of the cutting element 132 as it moves from the raised position to the lowered position is about two inches.

After the cutting element 132 cuts the twine 121, the cutting element 132 returns to its raised position via extension of the actuator 134 and rotation of the rod 136 in an opposite direction of the direction of rotation to move the cutting element 132 from its raised position to its lowered position.

Once the cutting element 132 has cut the twine 121 and returned to its raised position, the one or more actuators 111 retract and return the bale grabbing members 109a, 109b to their retracted position. As the grabbing members raised out of the bale 114, the bale 114 falls downwardly (e.g. into a further processing equipment).

Figure 8A:
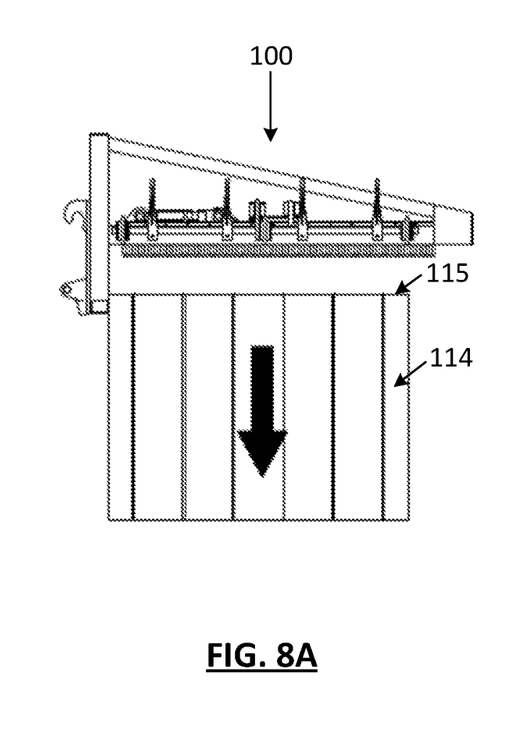
FIG. 8A shows a side view of the apparatus of FIG. 1 positioned above a bale with the bale grabbing mechanism of the apparatus in a retracted position.
Figure 8B:
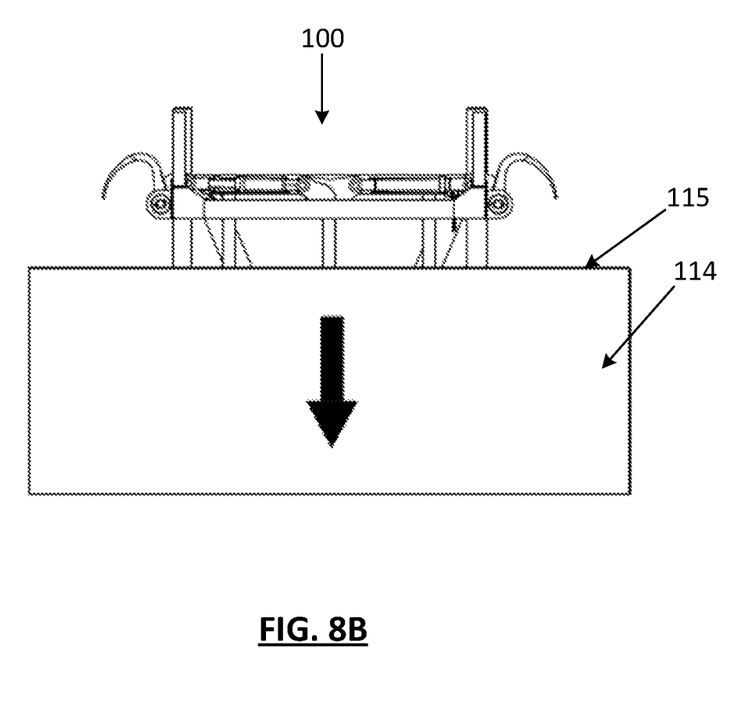
FIG. 8B shows a front view of the apparatus of FIG. 1 positioned above a bale with the bale grabbing mechanism of the apparatus in the retracted position.

Twine grabbing mechanism 120 retains the twine 121 pinched between one or more of the sliding twine grabbing member 120b and the fixed twine grabbing member 120a. The arrows shown in FIGS. 8A and 8B show the direction of movement of the bale upon being released from the frame 102 (e.g. downward).

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

What is claimed is:

1. An apparatus for removing a twine from a bale, the apparatus comprising:
   a frame having:
      a mounting portion configured to releasably mount to a vehicle, and
      two opposed arms rigidly coupled to and extending in a common direction from the mounting portion;
   a bale grabbing mechanism coupled to the frame and configured to releasably secure the bale against the opposed arms of the frame;
   a cutting mechanism movably coupled to one of the opposed arms of the frame, the cutting mechanism including a cutting element being configured to cut the twine, the cutting element being configured to rotate about an axis defined by a length of one of the opposed arms to move between a raised position and a lowered position to cut the twine; and
   a twine grabbing mechanism coupled to the other opposed arm of the frame, the twine grabbing mechanism being configured to retain the twine after the twine has been cut by the cutting mechanism.

2. The apparatus of claim 1, wherein the bale grabbing mechanism comprises a pair of bale grabbing mechanisms, each bale grabbing mechanism including plurality of bale grabbing members movably mounted on one of the two opposed arms of the frame, the bale grabbing members being dispersed along the length of each of the opposed arms of the frame.

3. The apparatus of claim 2, wherein the bale grabbing members are configured to move between a retracted position where the bale grabbing members are positioned above the bale and an extended position where the bale grabbing members are inserted into a surface of the bale.

4. The apparatus of claim 1, wherein the cutting element extends along the length of one of the opposed arms.

5. The apparatus of claim 4, wherein the cutting element is a knife.

6. The apparatus of claim 1, wherein the twine grabbing mechanism and the cutting mechanism are positioned on different arms of the frame.

7. An apparatus for removing a twine from a bale, the apparatus comprising:
   a frame having:
      a mounting portion configured to releasably mount to a vehicle, and
      two opposed arms rigidly coupled to and extending in a common direction from the mounting portion;
   a bale grabbing mechanism coupled to the frame and configured to releasably secure the bale against the opposed arms of the frame;
   a cutting mechanism movably coupled to one of the opposed arms of the frame, the cutting mechanism including a cutting element being configured to cut the twine; and
   a twine grabbing mechanism coupled to the other opposed arm of the frame, the twine grabbing mechanism being configured to retain the twine after the twine has been cut by the cutting mechanism, the twine grabbing mechanism including:
      a fixed twine grabbing member fixedly coupled to one of the opposed arms; and
      a sliding twine grabbing member slidingly coupled to the one of the opposed arms, the sliding twine grabbing member being configured to slide over a fixed portion of the twine grabbing mechanism to grab the twine.

8. A method of removing a twine from a bale, the method comprising:
   positioning a frame of an apparatus for removing twine from the bale against a top surface of the bale;
   releasably securing the bale to the frame by a bale grabbing mechanism of the apparatus;
   gripping the twine by a twine grabbing mechanism movably coupled to the frame and positioned against the top surface of the bale;
   cutting the twine along a width of the bale by a cutting mechanism movably coupled to the frame and positioned against the top surface of the bale;
   releasing the bale from the frame; and
   retaining the twine by the twine grabbing mechanism as the bale falls downwardly relative to the frame.

9. The method of claim 8, wherein cutting the twine includes pivoting a cutting element of the cutting mechanism relative to the frame between a raised position where the cutting element is spaced from the bale and a lowered position where the cutting element engages the twine and cuts the twine wrapped around the bale.

10. The method of claim 9, wherein cutting the twine includes pivoting the cutting element relative to the frame by actuating a cutting hydraulic cylinder coupled to the frame.

11. The method of claim 8, wherein gripping the twine by the twine grabbing mechanism includes sliding a sliding portion of the twine grabbing mechanism relative to a fixed portion of the twine grabbing mechanism.

12. The method of claim 11, wherein gripping the twine by the twine grabbing mechanism includes retaining the twine between a plurality of teeth of the sliding portion of the twine grabbing mechanism and a plurality of teeth of the fixed portion of the twine grabbing mechanism.

13. The method of claim 8, wherein releasably securing the bale to the frame includes rotating a plurality of members of the bale grabbing mechanism from a retracted position where the members are spaced from the bale to an extended position where the members enter a bale space defined by the bale to releasably secure the bale to the frame.

14. The method of claim 13, wherein, at the extended position, the members enter the bale space defined by the bale through the top surface of the bale.

15. An apparatus for removing a twine from a bale, the apparatus comprising:
 a frame having:
  a mounting portion configured to releasably mount to a vehicle, and
  two opposed arms rigidly coupled to and extending in a common direction from the mounting portion;
 a bale grabbing mechanism coupled to the frame and configured to releasably secure the bale against the opposed arms of the frame;
 a cutting mechanism movably coupled to one of the opposed arms of the frame, the cutting mechanism including a cutting element being configured to cut the twine, the cutting mechanism including a cutting hydraulic cylinder for rotating the cutting element to cut the twine; and
 a twine grabbing mechanism coupled to the other opposed arm of the frame, the twine grabbing mechanism being configured to retain the twine after the twine has been cut by the cutting mechanism.

16. The apparatus of claim 7, wherein the twine grabbing mechanism includes a twine grabbing hydraulic cylinder for moving the sliding twine grabbing member relative to the fixed twine grabbing member to retain the twine.

17. The apparatus of claim 15, wherein the cutting element extends along a length of one of the opposed arms.

18. The apparatus of claim 15, wherein the twine grabbing mechanism and the cutting mechanism are positioned on different arms of the frame.

19. The apparatus of claim 7, wherein the cutting element extends along a length of one of the opposed arms.

20. The apparatus of claim 7, wherein the twine grabbing mechanism and the cutting mechanism are positioned on different arms of the frame.

* * * * *